United States Patent [19]

Lewicki, Jr. et al.

[11] Patent Number: 5,162,179

[45] Date of Patent: Nov. 10, 1992

[54] ELECTROGRAPHIC STRUCTURE AND PROCESS

[75] Inventors: Walter J. Lewicki, Jr., Lancaster, Pa.; John H. Bowers, Clarksburg, N.J.

[73] Assignee: Armstrong World Industries, Inc., Lancaster, Pa.

[21] Appl. No.: 510,067

[22] Filed: Apr. 17, 1990

[51] Int. Cl.5 .................... G03G 8/00; G03G 13/01
[52] U.S. Cl. ............................. 430/15; 430/14; 430/53; 430/97; 430/124; 430/46; 430/47; 346/159
[58] Field of Search .............. 430/53, 97, 124, 961, 430/46, 47, 14, 17, 15; 346/159

[56] References Cited

U.S. PATENT DOCUMENTS

| | | | |
|---|---|---|---|
| 3,788,930 | 1/1974 | Honjo et al. | 430/124 |
| 4,038,545 | 7/1977 | Komaki et al. | 430/53 |
| 4,155,093 | 5/1979 | Fotland et al. | 346/159 |
| 4,234,644 | 11/1980 | Blake et al. | 430/124 |
| 4,259,429 | 3/1981 | Gilliams et al. | 430/124 |
| 4,477,548 | 10/1984 | Harasta et al. | 430/124 |
| 4,600,669 | 7/1966 | Ng et al. | 430/124 |
| 4,668,598 | 5/1987 | Moskowitz | 430/53 |
| 4,879,194 | 11/1989 | Snelling | 430/53 |
| 5,021,318 | 6/1991 | Mayo et al. | 430/124 |

Primary Examiner—Richard L. Schilling
Attorney, Agent, or Firm—James J. Ralabate

[57] ABSTRACT

This invention involves a structure containing a layered imaged configuration with an overcoating layer. The overcoating layer, in addition to encapsulating the toned image, substantially strengthens the dielectric layer after it is removed from the system. Also, a process for producing a product having an image depth perception and the product itself are disclosed. The layered structure may have one or two dielectric layers having a combined thickness of from about 0.2 to about 10.0 mils.

9 Claims, 5 Drawing Sheets

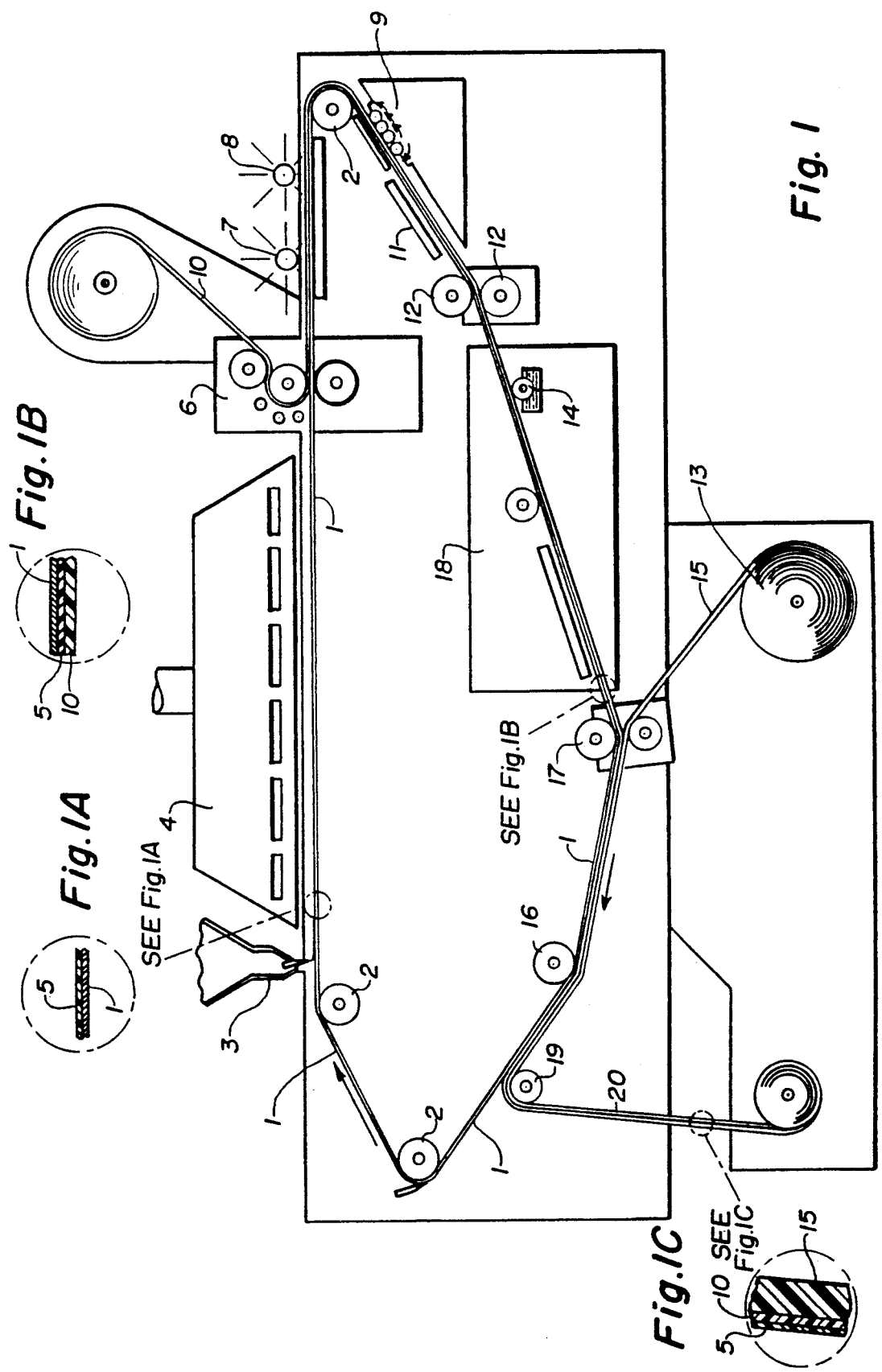

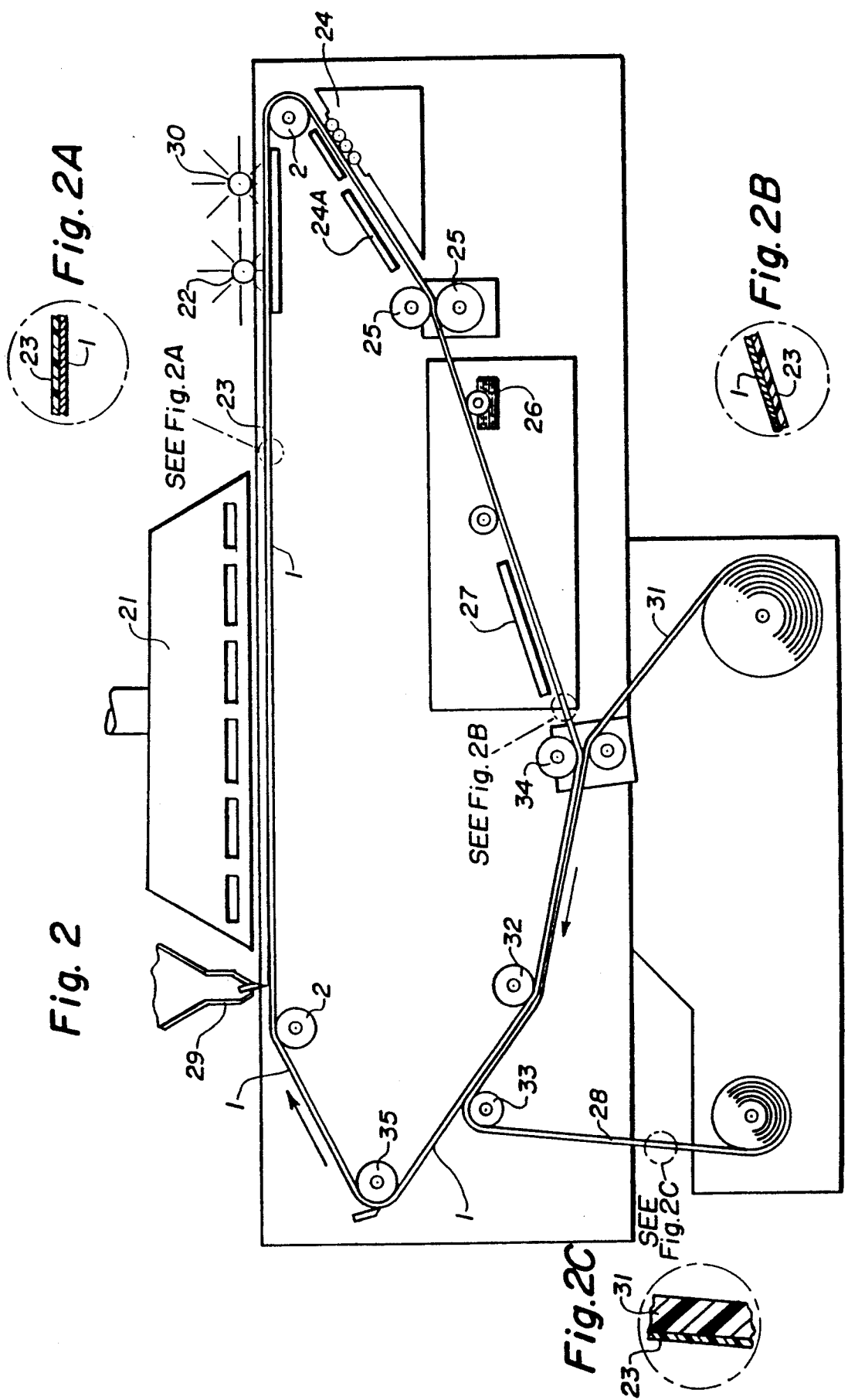

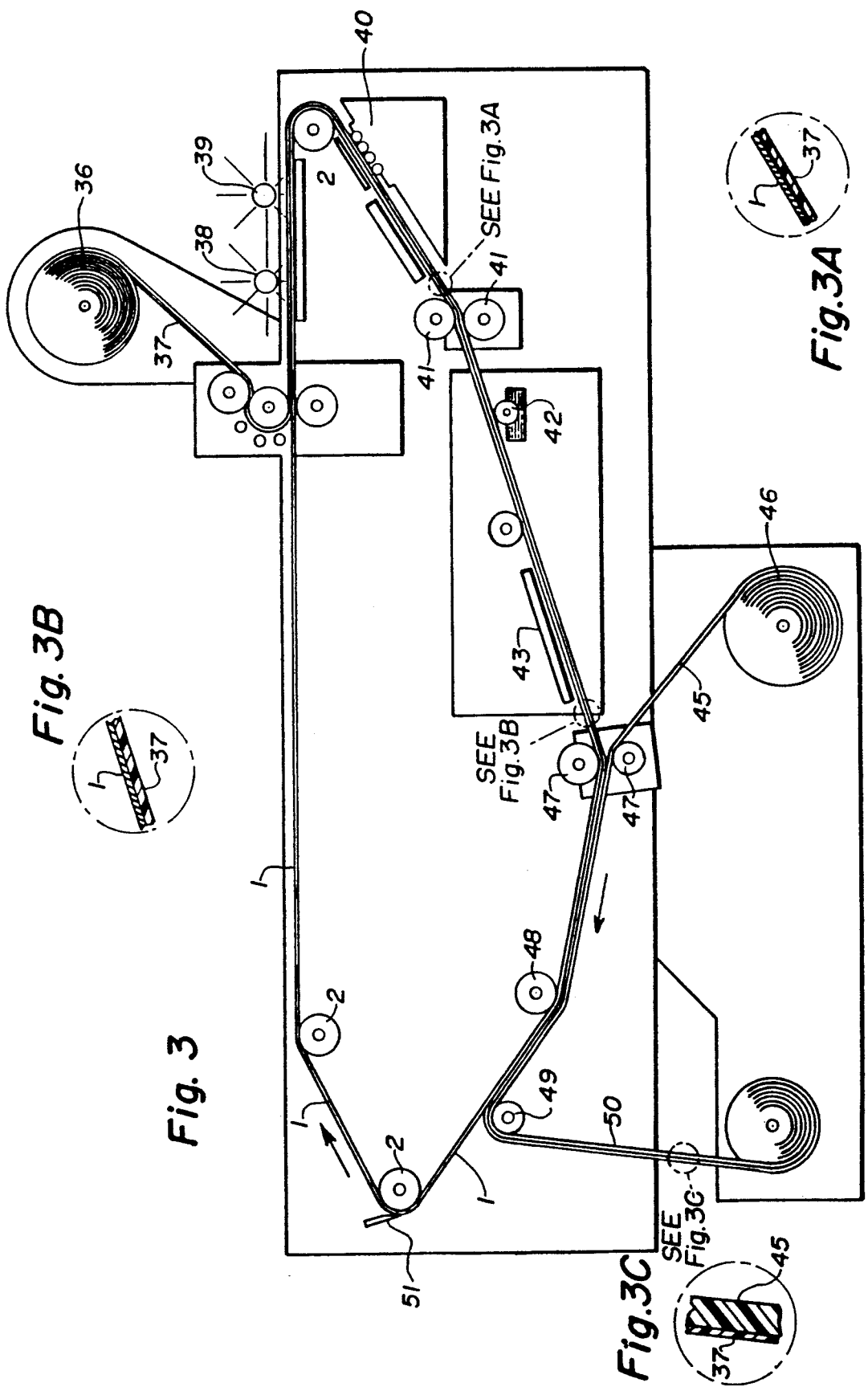

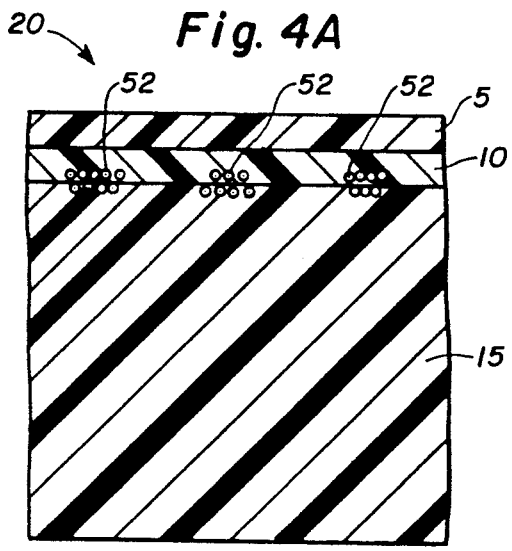
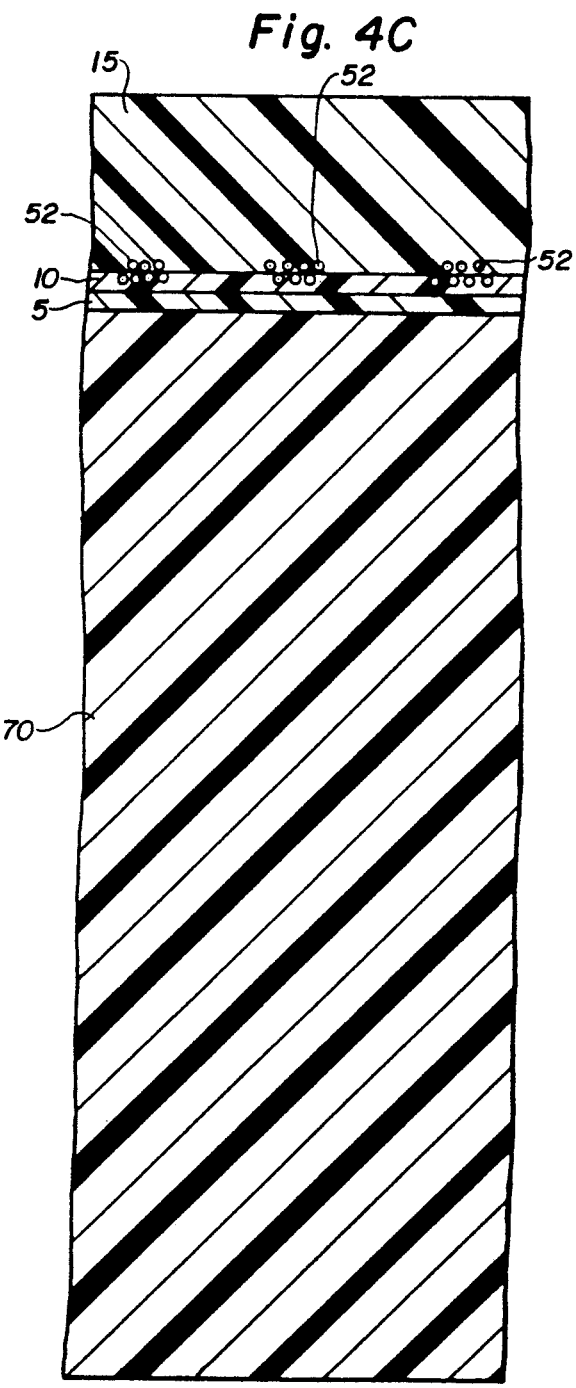
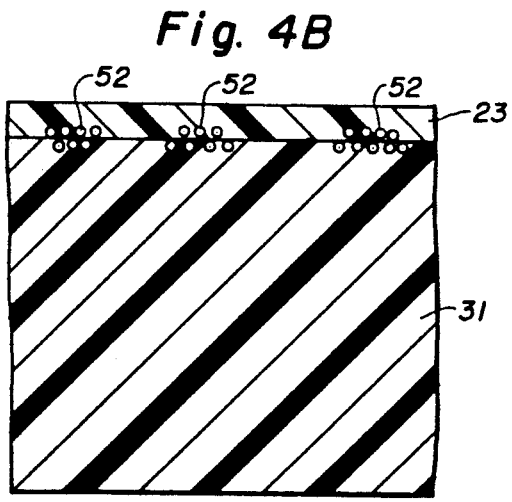

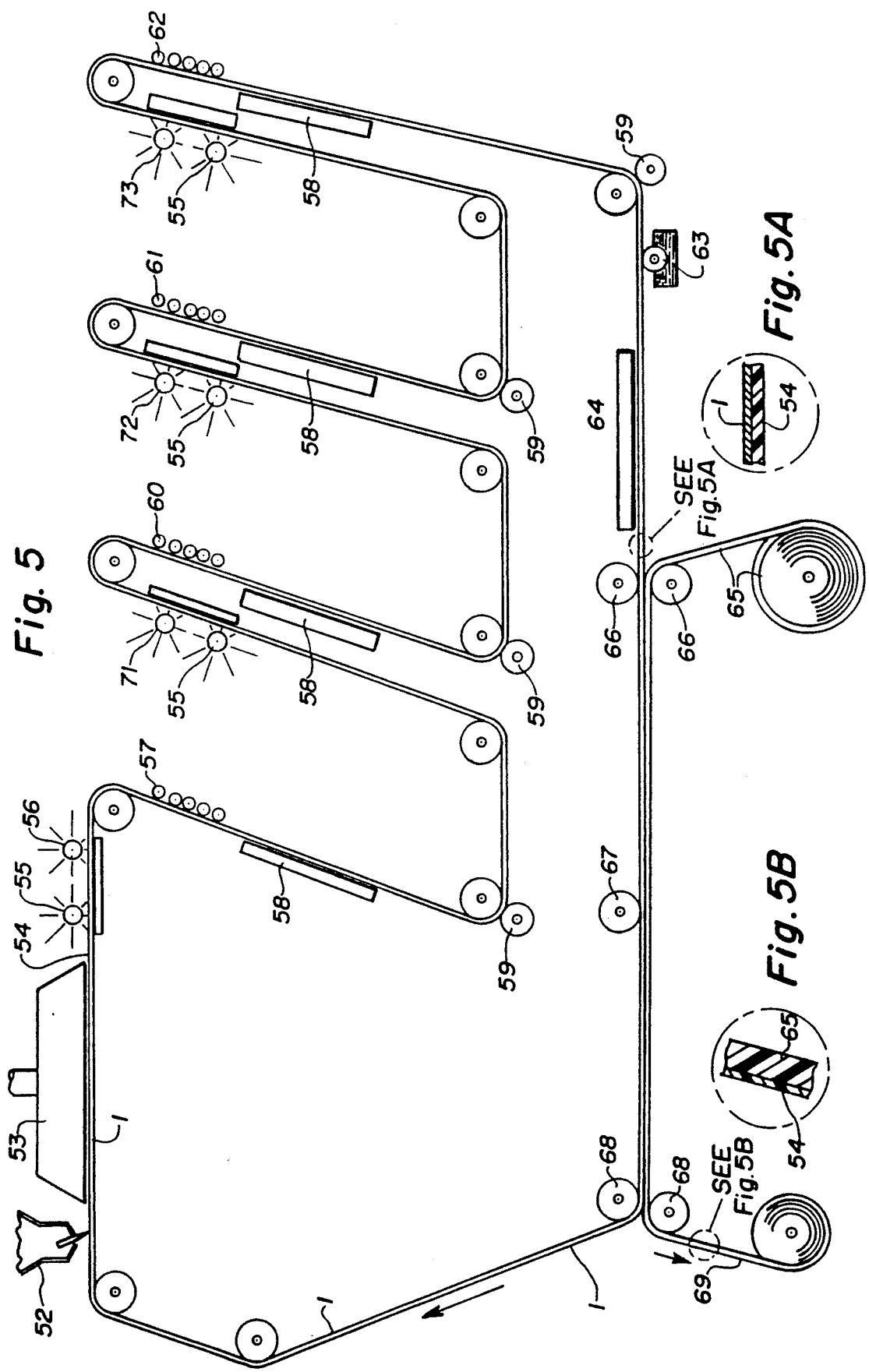

ELECTROGRAPHIC STRUCTURE AND PROCESS

This invention relates to a novel imaging process and structure and, more particularly, to an ion projection process and a structure produced by said process.

BACKGROUND OF THE INVENTION

Systems using ion projection technology are well known in the art. These systems use an electrostatic charge pattern which corresponds to a desired image. This imagewise charge is deposited upon the dielectric surface of a drum or belt. This surface bearing the latent electrostatic image is moved through a developer station where a toning material of opposite charge adheres to the charged areas of the dielectric surface to form a visible image. The drum or belt is advanced forward and the toned image is either transferred to a receiving media or fused directly on the dielectric surface. After the fusing operation in the transfer system, the dielectric can be treated in various ways to clean its surface of residual charge or toner or both. This cleaning can be performed by any known electrostatic cleaning method.

In imaging and printing processes, both photoconductive insulators and dielectrics have been used; however, they are quite different from each other. Photoconductive insulators will only hold an electrical charge in the dark which makes them useful in limited applications such as copiers and the like. Dielectrics, on the other hand, can hold an electrical charge in the presence of visible light which makes them much more practical for use in commercial manufacturing processes such as the present invention. There are also known many electrostatic printing systems such as those described in U.S. Pat. Nos. 3,023,731 (Schwertz); 3,701,996 (Perley); 4,155,093 (Fotland); 4,267,556 (Fotland); 4,494,129 (Gretchev); 4,518,468 (Fotland); 4,675,703 (Fotland); and 4,821,066 (Foote). All of these systems disclose non-impact printing systems using electrostatic images that can be made visible at one or multiple toning stations. In those systems ions are projected from an ion-generating means onto the surface of a dielectric layer by a print head such as described by Fotland in U.S. Pat. No. 4,155,093 or in U.S. Pat. No. 4,267,556. Generally, the print head comprises a structure of two electrodes separated by a solid dielectric member, a solid dielectric member and a third elecrode for the extraction of ions. The first electrode is a driver electrode and the second is a control electrode; both are in contact with the separating dielectric layer. There is an air space at a junction of the control electrode and the solid dielectric member. A high voltage high frequency discharge is initiated between the two electrodes creating a pool of negative and positive ions in the air space adjoining the control electrode. The ions are extracted through a hole in the third electrode by an electrostatic field formed between the second and third electrodes. In Fotland U.S. Pat. No. 4,267,556 the image-forming ion generator takes the form of a multiplexed matrix of finger electrodes and selector bars separated by a solid dielectric member. Ions are generated at apertures in the finger electrodes at matrix crossover points and extracted to form an image on a receiving member. Grey scale control is achieved by pulse width modulation of the second (finger) electrode as described by Weiner U.S. Pat. No. 4,841,313. While prior art ion projection heads are useful in many applications, they are not adapted for use in systems requiring a relatively thick and hence low capacitance dielectric imaging layer. Generally, in electrography, liquid development systems are best suited to accurate rendition of grey scale images and high resolution development. The components of toner systems can contaminate the electrodes in prior art ion projection heads and can render them substantially non-functional. Incorporation of an air knife prior to the ion projection head can reduce the exposure of the head to contamination. The air knife will prevent exposure of the ion projection head to toner particles and the solvents in liquid toners by purging the space around the ion projection head with solvent free air or gas. Prior art ion projection heads are not only not particularly desirable for grey scale printing, but have substantial limits concerning the number of grey scales that can be achieved. For example most can manage to achieve only a maximum of 4 grey scales. Improved novel ion projection heads are required to provide acceptable results in systems in which a wide range of grey scale reproduction is required. Generally, liquid development systems are required for accurate rendition of grey scale images.

In addition to the deficiencies in prior art print heads, the known electrographic printing systems are not specifically designed to accommodate multicolored printing processes at rapid speeds. Therefore, while ion-generating systems utilize inherently sound technology, there are several major improvements that need to be found before these systems can be used to produce multicolored final products of high print quality and at rapid speeds.

SUMMARY OF THE INVENTION

It is therefore an object of this invention to provide an ion projection process and its resulting product that are devoid of the above-noted disadvantages.

Another object of this invention is to provide a high quality imaged dielectric layer that can be used as a component in final products of varying thicknesses.

Still a further object of this invention is to provide a novel high quality continuous tone product prepared by a novel ion projection process.

Still another object of this invention is to provide a process that is capable of producing multicolored images having the perception of depth.

Yet still a further object of this invention is to provide a rapid non-impact process for the production of high quality materials of relatively thicker dimensions than heretofore possible.

Still yet another object of this invention is to provide a high quality imaged dielectric layer that can be used by itself or together with other layers as a final product.

The foregoing objects and others are accomplished according to this invention by providing a system using dielectric imaging layers having a substantially thicker cross section and lower capacitance than those of the prior art. Since the capacitance of the dielectric can be substantially lower from the capacitance of those generally used in the prior art, novel method modifications were required to accommodate the dielectric layer. The prior art print heads as above noted used could not be used in the present invention because the number of ions deposited per RF cycle is too great. The novel print head used in this invention is used in a nitrogen or other inert atmosphere where exothermic reactions during ionization in air are prevented thereby reducing substantially the operating temperature of the print head. This increases the longevity of the print head and provides improved performance. Also, the air knife used in the present system with the ion projection head will prevent exposure of the ion projection head of solvents in liquid toners by purging the space around the ion projection head with solvent. Since the imaged dielectric layer is to be removed after image fixing precaution was needed to ensure a minimum of shrinkage of the layer and distortion thereby of the image. To prevent shrinkage or to hold shrinkage to acceptable levels, an overcoating of a clear resin is laminated onto the imaged surface of the dielectric. This laminated overcoating has a thickness of at least 3 mils and provides image stability to the fixed colored image. Thicknesses of this laminated overcoating can vary up to 20 mils or greater depending upon the desired final product. In making floor tile, for example, the thickness and hardness requirements of the overcoating laminate will exceed those of wallpaper requirements. For those products where performance (image protection) is not as important to the end product, such as would be the case for a graphic poster used in point of sale advertising, an overcoating layer less than 3 mils can be used. Some clear acrylic materials can be applied from conventional coating, spraying and drying means and can be as thick as 0.2 mils in thickness. Materials that would be suitable for the dielectric layer are materials such as non-porous vinyl materials consisting of polyvinylchloride, copolymers of vinylchloride with minor portions of others materials such as vinyl acetate, vinylidene chloride, and other vinyl esters such as vinyl proprionate, vinyl butyrate, as well as alkyl substituted vinyl esters. Although the dielectrics based on polyvinylchloride are preferred, the invention has broad application to other polymeric materials consisting of polyethylenes, polyacrylates (e.g. polymethylmethacrylate), copolymers of methylmethacrylate such as methyl/n-butyl methacrylate, polybutylmethacrylate, polybutylacrylate, polyurethane, polyamides, polyesters, polystyrene and polycarbonates. Also, copolymers of any of the foregoing or mixtures of the foregoing may be used. The dielectric layer of the present process should have a resistivity of at least 10 ohm-centimeters. In addition, the dielectric layer must have inherent adhesive characteristics to bond to toner materials and overcoatings.

While the process of the present invention can be used to produce monochromatic imaged final products, it is particularly suitable for use in a multicolor system. In both monochromatic imaging and in multicolor imaging,,the present system is capable of providing up to 32 levels of grey scale.

In a color system a plurality of modified print heads and development stations are used. By providing, for example, four ion projection heads coupled with respective color development stations around a conductive drum or endless belt, conventional station-to-station, registration of the images on the dielectric layer is minimized and final registration is done electrically. The dielectric layer film is wound around the drum or adhered to the endless belt and continuously supplied and removed to and from the system. A spool of dielectric film can be continuously supplied to the system prior to approaching the first imaging station or ion projection head. The dielectric layer should have a thickness of from about 0.2 to about 10.0 mils. After advancing through the imaging and development stations, the final imaged dielectric layer or film is then sprayed with a vinyl adhesive overcoating, air dried and removed from the system. Subsequent to removal of the overcoated, imaged dielectric layer is laminated onto a but is not limited to base of about at least 60 mils thick.

In one embodiment of the invention if it is desired to produce a final imaged product with depth perception, a first dielectric layer is imaged and developed as in a monochromatic system, then a second dielectric layer is imaged and developed with a second color and a third or more dielectric layers imaged and developed, etc. The resulting imaged dielectric layers are then stacked one over the other and the uppermost dielectric layer is laminated with a clear overcoating having a thickness of at least 3 mils and preferably from 3-20 mils. The thickness of the overcoating layer is important because it can provide an abrasion resistant surface to the electrographic images of the laminate structure which might become wall and floor tiles. In this embodiment of the invention, it is preferred that the dielectric layers used be substantially colorless.

In all of the above-defined procedures, a final high quality imaged and laminated dielectric layer is produced. This final product can then be laminated onto a substrate or base having a suitable thickness for the desired product, the substrate used in this invention has a thickness of at least 10 mils. For example, if a floor tile was desired, the substrate would be substantially thicker than a wall tile or wallpaper, etc. An appropriate adhesive is applied between product layers to ensure sufficient binding to each other. For best results, drying or evaporation stations are positioned in the system to remove liquids after liquid deposition such as dielectric mixtures, liquid development or adhesive spraying.

EXAMPLES AND PREFERRED EMBODIMENTS

The following are examples of the specific non impact printing process of the present invention.

EXAMPLE #1

A dielectric vinyl coating made from a formulation consisting of 20% solids of VAGH resin, manufactured by Union Carbide, in a methylisobutylketone solvent (MIBK) was applied to a 3 mil thick stainless steel belt using a knife coater. It was dried in an oven at 130° F. with the resulting thickness being 0.5 mil. The coated stainless steel belt was conveyed past an ac discharge corona to neutralize the surface of the dielectric coating. An S3000 ionographic print head manufactured by Delphax Systems, Mississauga, Canada, in combination with a nitrogen environment was used to apply charge to the dielectric coating. The head was spaced approximately 10 mils above the surface of the dielectric coating. The nitrogen formed an inerting and cooling blanket between the bottom screen of the print head and the dielectric coating.

Pulse width modulation of the head supplied by a separate electronics package varied between 0.8 and 2.2 microseconds in 16 equally timed increments. The charge was applied to the dielectric coating in the form of a checkerboard pattern having different levels of charge. The dielectric was then toned with a cyan liquid toner (CPA-04) supplied by the Research Labs of Australia, Adelaide, Australia. The toner was at a 4% concentration in ISOPAR G. The developing system used was a three roller type used by the Savin Corp., Stamford, Conn. in the 7450 photocopier, and adapted for this process. After evaporation of the ISOPAR using a combination of heated air and a heated platen on the backside of the stainless steel belt, the surface temperature measured 100° F. The toner was fixed to the surface of the dielectric coating using a 16.7% solids of YAGH resin in a solvent blend of MIBK and methylethylketone (MEK). The process for fixing was spray fixing followed by drying using heated air.

While the dielectric coating was still attached to the stainless steel belt it was conveyed through a pair of laminating rolls where a 3 mil thick clear rigid polyvinyl chloride film made by Klockner Pentaplast, Gordonsville, Va. was applied to the fixed toned surface of the dielectric. The temperature of lamination was 250° F. The total structure was then cooled to ambient temperature and separated from the stainless steel belt.

The resulting film showed distinct blocks of cyan color sandwiched between the dielectric coating and the 4 mil rigid polyvinylchloride film having different optical densities and demonstrated the attainment of 16 levels of grey.

This electrographically imaged structure can be further processed by laminating the dielectric side of the laminate to a 10 mil thick white vinyl coated board using a conventional flat bed press at 250° F. The laminated structure was cooled down to ambient temperature before it was removed from the press.

The resulting structure is made as a poster typically for use in the graphics art industry.

EXAMPLE #2

The electrographically imaged structure which is separated from the stainless steel belt of Example #1 can be further made into a floor tile structure. In this case, the dielectric coating will be bonded to a 60 mil thick tile base consisting of limestone and vinyl: binders, plasticizers and stabilizers. The decorated laminate removed from the stainless steel belt is subsequently combined with the 60 mil thick tile base in a heated press. The conditions of the pressing are 320° F., 30 seconds and 80 psi. After cooling to ambient temperatures, the resulting laminate structure is completely bonded to the tile base with the electrographic image fully intact.

EXAMPLE #3

A 1.5 mil rigid white polyvinylchloride dielectric film made by the Orchard Corp., St. Louis, Mo. was adhered to the stainless steel belt using the same dielectric coating as was applied in Example #1. In this case, before the VAGH coating was completely dried and at a surface temperature at 250° F. on the belt, the 1.5 mil white film was applied. The film contained a 0.2 mil coating of the same VAGH resin which was preapplied to the film using conventional rotogravure printing means. After cooling, it was corona discharged and electrographically imaged as in Example #1. The same ionographic head configuration and process that was used in Example #1 was used in this example to image and tone the 1.5 mil white dielectric film. After evaporation of the ISOPAR, the toned image was fixed in a steel over rubber roller fixing nip at a surface temperature of 200° F. The fixing roller was at 125° F. to prevent the toner from lifting from the dielectric surface as it passed through the nip.

The resulting structure was removed from the belt at ambient temperatures and post laminated to the same base as in Example #2 to form a floor tile structure.

EXAMPLE #4

A 10 mil clear rigid polyvinylchloride dielectric film made by Klockner Pentaplast, Gordonsville, Va. was adhered to a stainless steel belt as described in Example #1. The film was imaged and toned using the same configuration and process as described in Example #1. After ISOPAR evaporation, the grey scale configuration was overcoated with a clear spray of a 16.7% VAGH resin in a mixture of MIBK and MEK solvents. After evaporation of the solvent using conventional drying means, the imaged and toned structure is removed from the belt after cooling to ambient temperatures.

In a subsequent step, the fixed side of the imaged 10 mil dielectric film is laminated to the surface of a 100 mil tile base consisting of limestone and vinyl: binders, stabilizers and plasticizers. The conditions of laminating are the same as described in Example #2. The resulting structure is well adhered to the tile base and is suitable for installation as a floor tile structure in high traffic areas such as shopping malls and the like.

BRIEF DESCRIPTION OF THE DRAWING

FIGS. 1, 1A, 1B and 1C show a schematic side view of a printing system used to produce the novel structure of this invention.

FIGS. 2, 2A, 2B and 2C show a schematic side view of a second embodiment used to make the novel structure of this invention.

FIGS. 3, 3A, 3B and 3C show a schematic side view of another embodiment used to make the novel structure of the present invention.

FIGS. 4a, 4b and 4c are sectional side views of the novel final product prepared by the above noted printing systems.

FIGS. 5, 5A and 5B show a schematic side view of a system using a plurality of stations to make a novel multicolor structure of the present invention.

DESCRIPTION OF THE DRAWING AND PREFERRED EMBODIMENTS

For the sake of clarity, several stations are disproportionately illustrated in relation to the entire system. Also, insignificant parts may not be shown.

In FIG. 1 a printing system is shown having an endless stainless steel or other conductive web or belt 1 which is driven by any suitable power means. This belt 1 is entrained about a series of primary rollers 2 and other suitable supporting and guiding structures. The belt 1 is driven through a series of electrographic stations which are generally similar to those used in conventional ionography or xerography, i.e. charge, develop and fixing stations. However, in the present process a substantially thicker dielectric material is used and can be coated on the belt 1 from solution from a powder or liquid formulation. This coating is accomplished at deposition coating station 3. After solution deposition at station 3, the belt 1 with the liquid dielectric formulation thereon is passed through an evaporation chamber 4 where the liquid or solvent of the dielectric formulation is removed, leaving a white or colorless dielectric layer 5 on belt 1. To ensure that layer 5 has a surface free of defects at least one additional thin clear, white or colored dielectric film 10 may be provided at dielectric roll station 6. It is intended that the dielectric 5 deposited at station 3 and the dielectric film 10 supplied at station 6 now provides a final dielectric layer having a thickness of up to about 10.0 mils. Present upon belt 1 now is a two-layered dielectric material including dielectric layer 5 deposited at station 3 and dielectric film 10 deposited at film station 6. The film of dielectric 10 may have a built in adhesive material which can be activated by a heater at film station 6. As will be described below in FIGS. 2 and 3, stations 3 and 6 may be used together or separate from each other in the present system. Once a surface defect-free dielectric layers 5 and 10 are deposited on belt 1, the combined dielectric layer is surface discharged by corona discharge 7 to ensure an electrically clean dielectric capable of accepting and retaining the latent image charge. When the "dielectric layer" is referred to in this FIG. 1 it is intended to include layers 5 and 10. Once the dielectric layer has been discharged by any suitable means, it is operatively passed through image station 8 which comprises an apparatus for generating charged particles in image configuration. These ions in imagewise configuration are extracted from the print head at station 8 to form the latent electrostatic image on the combined dielectric layers 5 and 10. The novel print head used in this invention is used in a nitrogen or other inert atmosphere to prevent an exothermic chemical reaction during ionization in air thereby substantially reducing the operating temperature of the print head. This increases the longevity of the print head and provides improved performance. Also, an air knife is used with the ion projection head which will prevent exposure of the ion projection head to toner particles and solvents in liquid toners by purging the space around the ion projection head with solvent-free air or other gases. The dielectric layer containing the latent image is then passed through a liquid toner at development station 9 where the latent image on it is made visible. It is preferred that the novel liquid toner used in the present invention comprises a resin of the same family as the resin used in dielectric layers 5 and 10. By using the same family of resins in both the toner and the dielectric, there is greater adhesion of the toner particle to the dielectric layer. The toned image is then passed under a heated platen 11 to evaporate the ISOPAR and/or other solvent from the liquid toner. ISOPAR is a registered trademark of EXXON. The dielectric layer is then passed through heat or pressure fix nip rolls 12 where the toned image is set or fixed to the dielectric. The adhesive resin used in the toner in addition to the above purpose, helps the toned particles adhere to each other. The dielectric layer with the image fixed or set at rollers 12 is then advanced to station 14 where an adhesive coating is placed on the imaged surface of the dielectric layer. This adhesive allows the clear overcoating 15 to bind to the imaged dielectric layer. At station or hood 18 the liquid of the adhesive is removed prior to coating of clear overcoating 15 on the dielectric layer. A clear overcoating 15 of polyvinylchloride or other suitable material is supplied from spool or reel 13. This overcoating 15, in addition to maintaining the integrity of the image, prevents shrinkage of the dielectric layer after drying. Any suitable overcoating may be used such as non-porous vinyl materials comprising polyvinylchloride, vinyl acetate, copolymers of vinylchloride with minor portions of other materials such as vinylacetate, vinylidene chloride, and other vinyl esters such as vinylproprionate, vinylbutyrate, as well as alkyl substituted vinyl esters. Although the dielectrics based on polyvinylchloride are preferred, the invention has broad application to other polymeric materials comprising polyethylenes, polyacrylates (e.g. polymethylmethacrylate), copolymers of methylmethacrylate such as methyl/n-butylmethacrylate, polybutylmethacrylate, polybutylacrylate, polyurethanes, polyamides, polyesters, polystyrene and polycarbonates. Also, copolymers of any of the foregoing or mixtures of the foregoing may be used. Some other filming overcoating materials, if suitable, can be used from films such as polyvinylchloride, vinyl acetate, vinylidene chloride, polyurethanes, vinyl esters, alkyl substituted vinyl esters, polyethylenes, polyesters, polyacrylates, copolymers or mixtures thereof. The resulting layer is advanced to rollers 17 fixing the clear overcoating 15 layer in position onto the dielectric layer. In a color system the above process is repeated with sequential color stations until the desired colored image is obtained before overcoating. The resulting overcoated dielectric layer may be used as a final product or may be combined after separation station 19 with other substrates in post process steps. For example, for the graphic arts industry, the overcoating may be clear and a thin 0.5 mil film either applied as shown from station 13 or from a formulation or as a formulation that may be applied using conventional coating, spraying and drying means. In addition, a thicker opaque substrate such as would be used in the manufacture of floor and wall tile, wallpaper, fabric, tile base or the like may be adhered to the under surface (non-imaged surface) of dielectric layer. This ranges from a paper thickness of 4.0 mils up to 1 inch in thickness for a ceiling tile product. After passing through rollers 17 where overcoating 15 is adhered to the dielectric layer, the resulting combined layer is passed through cooling rollers (or other means) 16, and then to cooling and separation roller 19 where the final product is separated from belt 1. The final product 20 is separated from belt 1 by heating or any other suitable means to separate it from belt 1. This generally occurs at 38° C. or less when using the dielectric materials of this invention. These dielectric materials include non-porous vinyl films comprising polyvinylchloride, copolymers of vinylchloride with minor portions of other materials such as vinyl acetate, vinylidene chloride and other vinyl esters such as vinyl proprionate, vinyl butyrate, as well as alkyl substituted vinyl esters. Although the dielectrics based on polyvinylchloride are preferred, the invention has broad application to other polymeric materials consisting of: polyethylenes, polyacrylates (e.g. polymethylmethacrylate) copolymers of methylmethacrylate such as methyl/n-butyl methacryl polybutyl methacrylate, polybutylacrylate, polyurethane polyamides polyesters, polystyrene and polycarbonates. These materials can be used for the dielectric 5 or the dielectric film 10 and they can be the same or different. For materials which are formulated to be subsequently heat reactivated type of adhesives as well as dielectrics, separation from belt 1 can be enhanced through the use of thin release coatings such as Teflon FEP which are a permanent part of the upper surface of the conductive belt 1. Teflon is a registered trademark of Dupont. As earlier noted, the toned image can be fixed at station 12 by pressure, heat, spray, or other suitable fixing methods. In any of these fixing methods, especially in a multicolor system, the toner particle must be fixed without substantially distorting the toner particle or the diameter of the toner particle. This is important to maintain optimum color quality and resolution of the final color image.

The final product 20 removed at station 19 comprises a dielectric layer 5, a second dielectric layer 10 and an overcoating layer 15. The combined thickness of layers 5 and 10 is from 0.2 to about 10.0 mils and the thickness of the overcoating layer 15 is from about 3.0 to about 20 mils.

The thickness of the overcoating, i.e. 3.0 to 20 mils is important to the structure of the present invention. At least 3.0 mils is required to strengthen the dielectric layer, less than 3.0 mils of overcoating does not provide the desired structural strength to the thin dielectric layer. When a floor covering final product is desired, up to 20.0 mils of overcoating provides the abrasion resistance required; over 20.0 mils would be as effective, however would be an overkill since 20.0 mils is more than adequate to provide the necessary protection to the decorative imaged dielectric layer and the necessary abrasion resistance for even floor tile.

In FIG. 2 a dielectric solution or dielectric liquid formulation is coated at station 29 upon an endless conductive belt 1. The liquid formulation is controlled in such a manner that upon evaporation of the solvent or liquid therefrom a dielectric layer 23 having a thickness of from about 0.2 to about 10.0 mils remains on belt 1 and the surface is free of defects. The solvent or liquid is removed by passing the dielectric solution or formulation through an evaporation chamber 21. Once the 0.2 to about 10.0 mil dielectric coating is achieved, the surface is electrically discharged by the use of a discharge corona 22 or other suitable means. After being discharged the dielectric layer 23 is charged in image configuration at station 30 by the same means as described in relation to FIG. 1. As the dielectric layer 23 progresses forward bearing with it the latent image, it passes through a developer station 24 where the latent image is toned and made visible. The liquid from the developer is removed and the toned image fixed by any appropriate means such as pressure, heat or spray fixing at fixing means 25. After it is passed through the developer station 24 including heated platen 24a, the toned imaged dielectric 23 is passed through fixing rollers 25. At station 26 an adhesive is applied on the imaged surface of dielectric layer 23 and this adhesive is dried at drying means 27. The adhesive now is tacky and ready to adhere to a clear overcoating 31. This overcoating is applied from an overcoating supply 31 such as polyvinylchloride. The adhesive applied also helps lock the toner into the surface of the dielectric and the application of the clear overcoating 31 encapsulates the toner between the dielectric layer 23 and the overcoating 31. The overcoating 31 not only combines with dielectric layer 23 but also prevents shrinkage of the dielectric layer 23. The combined layer is passed through heating rolls 34 and hence to cooling rolls 32 and 33 and subsequently removed as the final product at separation roll 33 (which also is a cooling roll).

The endless belt 1 is then continuously moved to an appropriate cleaning station 35 to remove any debris and is now ready to accept another layer of dielectric at coating station 29.

In FIG. 3 the same sequence of steps as described in FIG. 2 is followed except that rather than a dielectric solution deposited at 29 in FIG. 2 upon the endless belt 1 in FIG. 3, a spool 36 of a film dielectric material supplies the dielectric layer 37 to the surface of belt 1. This film 37 also can have a thickness of 0.2 to 10.0 mils and preferably is 0.2 to 1.5 mils. Film 37 is adhered to belt 1 by any appropriate means and the film electrically discharged at station 38. Film 37 may have an adhesive applied if desirable. The dielectric film 37 is then image charged at station 39 (by the same method as in FIGS. 1 and 2) toned or developed at developer station 40, toner is fixed at fixing rollers or station 41. After the toner is fixed in place, the imaged film 37 is advanced to station 42 where an adhesive is applied over the imaged surface of film 37. This adhesive allows the clear overcoating to bind to the imaged dielectric layer 37. After any liquid is removed from the adhesive to make the adhesive tacky at station 43, the imaged layer 37 with the surface adhesive is advanced to station 44 where a clear overcoating 45 is applied from overcoating spool or supply 46. The overcoated film is then passed through heating rollers 47 where the overcoating 45 is firmly pressed and fixed to the imaged dielectric layer 37. The film is then advanced to cooling roller 48 and separation roller 49 where the final product 50 is removed from belt 1. The endless belt 1 then is cleaned by cleaning blade or other means 51 and is ready for accepting another film coating of dielectric material and circulation through another "imaging cycle", i.e. imaging, developing, fixing and removal cycle.

In FIG. 4a a cross-sectional side view of the final product 20 described in FIG. 1 is illustrated. The final product of the systems of FIGS. 2 and 3 would be similar to the product of FIG. 4 except they would not have two dielectric layers 5 and 10. In FIG. 2 the final product would have only layer 23 and in FIG. 3 the final product would have only layer 37. This product 20 is the result of the present system when the system of FIG. 1 is used in the multicolor mode. When more than one color toner 52 is deposited upon dielectric layer 10, each toner particle 52 has a built-in resin adhesive which permits it to adhere to the dielectric layer 10 and to each other. The clear polyvinylchloride overcoating 15 of from about 3–20 mils thick helps encapsulate the toner and provides image and dielectric structural stability. In addition, the overcoating 15 minimizes shrinkage of the dielectric layers 5 and 10. A base or substrate may be laminated to the top surface of dielectric 5 to form a composite final product such as a tile or wallpaper. Any decorative image can be electrographically supplied thereby to any substrate used for tile, wallpaper, ceiling or floor products.

In FIG. 4b a cross-sectional side view of the final product of FIGS. 2 and 3 is illustrated. In both FIGS. 2 and 3 only one dielectric layer is used, i.e. layer 23 in FIG. 2 and layer 37 in FIG. 3. Both final products however will look the same, thus FIG. 4b shows a dielectric layer 23 with a clear overcoating layer 31. In between layer 23 and layer 31 is the fixed toner particles 52.

In FIG. 4c a cross-sectional side view of the final product of FIG. 1 is illustrated having a substrate 70 (such as tile or wallpaper) attached to the non-imaged surface of dielectric layer 5. An adhesive may be placed between any of the layers 15, 10, 5 and 70 if desired to improve adhesion. When an adhesive is used it must be clear and not interfere with the visual or chemical properties of any of the layers. Substrate 70 is merely adhered to the non-imaged surface of the dielectric by placing an adhesive between layers 5 and 70 and pressing together. Any suitable means may be used to connect substrate 70 to the surface of the dielectric layer opposite to that surface adjacent to overcoating layer 15. An additional station such as a substrate station may be positioned in the systems of FIGS. 1, 2 or 3 at any location that is convenient, preferably subsequent to imaging the dielectric.

In all of the described figures, means can be used to recycle the dielectric layer to the same print head for at least a second imaging at a point after the first image fixing. This embodiment would be used in lieu of the multistation system shown in FIG. 5. Therefore, each of the systems shown in FIGS. 1, 2 and 3 can have any conventional means to recycle the dielectric layer (after a first image fixing) through the same stations, i.e. imaging station or print head, developer station, developer or toner liquid removal station, toner fixing station and lamination or overcoating station.

FIG. 5 shows an imaging or printing system similar to that described in FIG. 2 except in FIG. 5 a plurality of toning or developing stations are shown. In FIG. 5 a liquid dielectric is coated upon endless belt 1 at coating station 52 and the liquid evaporated off at drying chamber 53. A dielectric layer 54 up to about 10.0 mils now remains on belt 1. This layer 54 is then surface discharged at corona discharge 55 and image charged at print head 56. The latent image formed at 56 is then passed to a first developer station 57 where a liquid toner of a first color is applied. The liquid from this toner is removed at drying means 58 and the resulting toned image fixed at fixing nips or rollers 59. The imaged dielectric layer 54 is then passed through print heads 71, 72 and 73 which create latent images colorwise and through developer stations 60, 61 and 62 where different colored toners are applied and each fixed at fixing rollers 59. Each toner at stations 57, 60, 61 and 62 will selectively respond to selective latent images created by printheads 56, 71, 72 and 73 on dielectric layer 54. The finally imaged dielectric layer is then advanced to station 63 where an adhesive is applied to the image surface and at station 64 any liquid is removed from the adhesive making it tacky and ready to be combined with a clear overcoating 65. The overcoating 65 is pressed onto adhesive layer 54 and heated at rollers 66. A cooling roller 67 removes any heat from the resulting layered structure and this resulting structure passed to cool-separation rollers 68 where product 69 is removed from belt 1. Belt 1 is then cleaned and prepared for another run or cycle.

The novel imaged product 20 shown herein comprises a base layer 15 having a thickness of about 60–100 mils, an imaged dielectric layer 5 having a thickness of about 0.2 to 10.0 mils, and a clear resinous overcoating 19 having a thickness of about 3.0 to 20.0 mils. The resins in the dielectric layer 5 and the resins in the toner used to develop the image are from the same chemical family. By the "same chemical family" is meant those materials that are made from the same moiety, for example, vinyl in polyvinylchloride and polyvinyl acetate.

The preferred and optimumly preferred embodiments of the present invention have been described herein and shown in the accompanying drawing to illustrate the underlying principles of the invention but it is to be understood that numerous modifications and ramifications may be made without departing from the spirit and scope of this invention.

What is claimed is:

1. An electrographically imaged medium comprising a base substrate, at least one electrographically imaged dielectric layer, and at least one overcoating layer, said base substrate having positioned thereon said dielectric layer, said dielectric layer having a thickness of from about 0.2–10.0 miles and comprising at least one colored image, said colored image having at least one overcoating layer thereon, said overcoating layer having a thickness of from about 1.0–20 mils and comprising a substantially clear resin material, said dielectric layer and said colored image comprise a material from the same family of materials, and wherein said base substrate has a thickness of at least 10 mils.

2. The image medium of claim 1 wherein said material used is selected from the group consisting of polyvinyl chloride, vinyl acetate, vinylidene chloride, vinyl esters, alkyl substituted vinyl esters, polyethylenes, polyesters, polyurethanes, polyacrylates, polystyrene, polycarbonates, copolymers of these and mixtures thereof.

3. The imaged medium of claim 1 having an image comprising a plurality of colors on said dielectric layer.

4. The image medium of claim 1 wherein said dielectric layer is a white colored dielectric layer and has a thickness of at least 0.2 mils.

5. The image medium of claim 1 comprising a plurality of imaged dielectric layers, each of said layers having a thickness of at least 0.2 mils.

6. The imaged medium of claim 1 comprising a base layer, at least one dielectric layer, and at least one overcoating layer, said dielectric layer having at least one developed electrographic image thereon comprising at least one color, said dielectric layer abutting on its lower face said base layer and on its upper face said at least one visibly clear overcoating layer, said lower face having an adhesive in contact therewith to provide fixing to said base layer, said overcoating comprising a substantially clear organic resin having a thickness of from about 1.0–20 mils.

7. The imaged medium of claim 1 comprising a plurality of dielectric layers, said dielectric layers being white or colorless and each containing at least one electrographically deposited visible image thereon, said dielectric layers being layered one over the other in substantial image registration.

8. The imaged medium of claim 1 wherein said developed electrographic image comprises colored toner materials comprising a built-in adhesive, said adhesive adapted to permit separate toner particles to bond to each other and to said dielectric layer.

9. An electrographically imaged medium consisting essentially of a base substrate, at least one electrographically imaged dielectric layer, and at least one overcoating layer, said base substrate having a thickness of at least 10 mils and having positioned thereon said dielectric layer, said dielectric layer having a thickness of from about 0.2–10.0 mils and comprising at least one colored image, said colored image having at least one overcoating layer thereon, said overcoating layer having a thickness of from about 3.0–20 mils and comprising a substantially clear resin material, and wherein said dielectric layer and said colored image comprise a material from the same family of materials.

* * * * *

UNITED STATES PATENT AND TRADEMARK OFFICE
CERTIFICATE OF CORRECTION

PATENT NO. : 5,162,179
DATED : November 10, 1992
INVENTOR(S) : Walter J. Lewicki, Jr., et. al.

It is certified that error appears in the above-indentified patent and that said Letters Patent is hereby corrected as shown below:

Claim 1, Column 12, line 3, change "miles" to --mils--.

Signed and Sealed this

Twenty-eighth Day of September, 1993

*Attest:*

BRUCE LEHMAN

*Attesting Officer*  *Commissioner of Patents and Trademarks*